(No Model.)

O. W. SWIFT.
CAP FOR VEHICLE HUBS.

No. 248,066. Patented Oct. 11, 1881.

Witnesses:
C. E. Jones
Wm. Brown

Inventor
Orrin W. Swift
By A. O'Neill and Chas. J. Goch
attys

UNITED STATES PATENT OFFICE.

ORRIN W. SWIFT, OF NEW HAVEN, CONNECTICUT.

CAP FOR VEHICLE-HUBS.

SPECIFICATION forming part of Letters Patent No. 248,066, dated October 11, 1881.

Application filed July 20, 1881. (No model.)

*To all whom it may concern:*

Be it known that I, ORRIN W. SWIFT, a citizen of the United States, residing at New Haven, in the county of New Haven and State of Connecticut, have invented certain new and useful Improvements in Detachable Caps for Hub-Bands for Carriages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists in an improved construction of hub for vehicle-wheels and a removable cap for application thereto, as hereinafter described and claimed.

Figure 1:
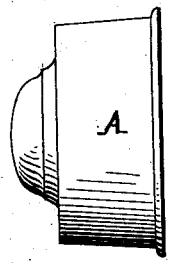
Figure 2:
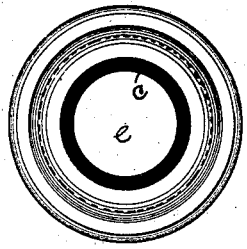
Figure 3:
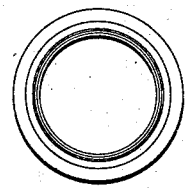
Figure 4:
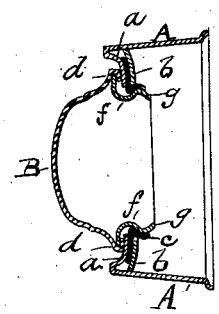

In the drawings, Figure 1 is a side elevation of my improved hub and cap. Fig. 2 is an under-side plan view thereof. Fig. 3 is an under-side plan view of the removable cap. Fig. 4 is a section on the line 4 4 of Fig. 1.

The invention is designed to produce a hub which is capable of ready application to the wheels of vehicles of every description, and is adapted to receive and securely hold a detachable cap for the purpose of excluding dust from the axle and hub, preventing the dripping of grease therefrom, and permitting the ready greasing or oiling of the wheels to which the device is applied.

A represents the hub, which is shown as of circular form, but it may be of any other shape desired, according to requirement. It is made gradually flaring from top to bottom. At the top of this hub is formed a downwardly and inwardly extending circumferential flange, $a$, while to the interior thereof, a short distance below the inner rim of said flange $a$, is secured or otherwise formed a second circumferential flange, $b$, which extends from the inner wall of the hub to the inner edge of the flange $a$. Between these two flanges $a$ $b$, I insert a washer or ring of rubber, leather, or other flexible material, and clamp said washer securely therein by pressing the flanges upon the same; or I may secure the washer $c$ within the flanges by cement or other suitable means, as found most convenient. This washer $c$ projects at its inner edge inward beyond the inner edges of the flanges $a$ $b$, to receive and hold the lower part of the cap B. This cap B is formed with a circumferential flange, $d$, which, when the lower portion of the cap is inserted within the central orifice, $e$, of the hub A, rests upon the upper face of the flange $a$.

The cap B may be formed in one piece, either by casting or by being struck up out of sheet metal; or it may be formed in two separate pieces, as shown in the drawings, and joined together. Within the lower end of the cap B is formed a circumferential groove, $f$, and an outwardly-protruding swell, $g$, so that on forcing the cap B down through the orifice $e$ within the hub the outwardly-extending lower portion, $g$, of said cap will press the protruding edge of the washer aside until the grooved or concaved portion $f$ of the cap comes opposite to the edges of the flanges $a$ $b$, and the flange $d$ rests upon the face of the flange $a$. When this position is reached the flexible washer will slightly expand and fill the interstice between the edges of the flanges and the lower end of the cap.

By the combined action of the concavity or groove $f$ and the swell $g$ against the washered flanges it will be seen that the cap is securely retained in position without possibility of removal or loosening by turning or coming in contact with other articles. Any amount of jolting or rough usage of the vehicle is not likely to displace the cap.

The cap can be easily removed whenever it is desired to oil the axle, it being simply necessary to grasp the top of the cap and pull outward in a direct line, when the washer will yield and readily allow of the withdrawal of the cap, its replacement being of equally easy accomplishment, it being simply necessary to push the lower end of the cap straight through the orifice $e$, when it will at once lock against the washer $c$ and flanges $a$ $b$, and entirely prevent the entrance to either the hub or axle of any dirt, dust, or water, and also prevent the exit therefrom of the lubricant.

It is well known that when dust is allowed to enter the hub of the wheel the grease or oil used for lubricating becomes gummy and causes the wheel to run hard. The entrance of dust to the hub or the axle is also objectionable, as the increased attrition resultant therefrom causes the rapid wearing away of the parts. My device, furnishing, as it does, a perfectly-tight cover to the axle, obviates all such objections, and, moreover, prevents the lubricating material exuding from the axle or hub and dropping on the floor and soiling it, and from soiling the clothing of persons who may come in contact with wheels having my improvement applied thereto—very common occurrences where perfectly-tight caps are not used.

Having thus described my invention, what I claim as new therein is—

1. The combination of the hub A, having flanges $a\ b$, and the washer $c$, secured at its outer edge between said flanges, its inner edge extending inwardly, to adapt it to receive and bind against the sides of a dust-excluding cap, substantially as shown and described.

2. The combination, with the hub A, having flanges $a\ b$, and elastic washer $c$, of the cap B, having flange $d$, groove $f$, and swell $g$, substantially as and for the purpose set forth.

In testimony whereof I affix my signature in presence of two witnesses.

ORRIN W. SWIFT.

Witnesses:
PETER FACHENBACH,
GIUSEPPE GALANO.